B. C. CHAMBERS.
Combined Hay-Fork and Pruning-Shears.
No. 208,462. Patented Oct. 1, 1878.
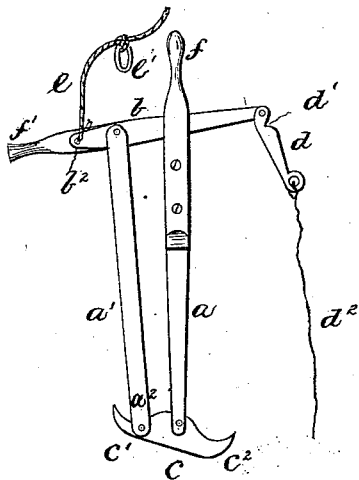
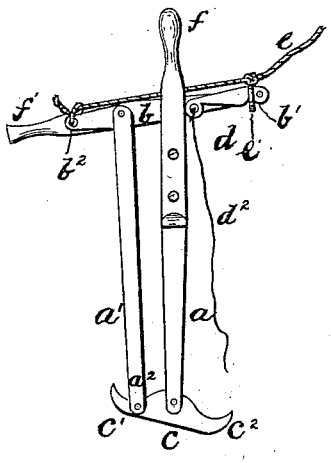
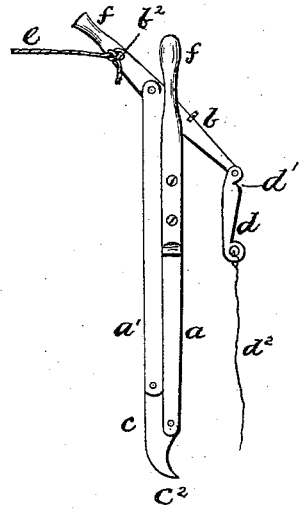

UNITED STATES PATENT OFFICE.

BENJAMIN C. CHAMBERS, OF SHADY PLAIN, PENNSYLVANIA.

IMPROVEMENT IN COMBINED HAY-FORK AND PRUNING-SHEARS.

Specification forming part of Letters Patent No. 208,462, dated October 1, 1878; application filed August 14, 1878.

*To all whom it may concern:*

Be it known that I, BENJAMIN C. CHAMBERS, of Shady Plain, in the county of Armstrong and State of Pennsylvania, have invented certain new and useful Improvements in Combined Hay-Fork and Pruning-Shears; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to furnish a device which may be employed as a horse hay-fork and as pruning-shears; and it consists in the combination and arrangement of the arms, levers, cords, &c., as will be hereinafter fully explained.

In the drawings, Figure 1 is a side elevation, showing the draft-rope unhooked. Fig. 2 is the same with draft-rope hooked on the end of cross-bar; and Fig. 3 shows the device arranged for thrusting down into the hay.

$a\ a'$ are two vertical arms arranged parallel with each other. They have their upper ends pivoted to a cross-bar, $b$, on one end of which is formed a notch, $b^1$, on its under side, and has at its opposite end a hole, $b^2$, in which the draft-rope is fastened.

The lower end of the arm $a$ is pivoted to the center of a foot, $c$, which is constructed with the pointed wings $c^1\ c^2$, curved upward, as shown.

The lower end of the arm $a^1$ is pivoted out on the wing $c^1$ in such position as to preserve it parallel with the arm $a$ and permit the free folding movement of the device, for purposes hereinafter set forth. The upper edge of the wing $c^1$ is made sharp, and cuts against an edge, $a^2$, formed on the outer edge of the lower end of the bar $a^1$.

$d$ is the tripping-lever, which is pivoted to the cross-bar $b$ at the end in which is formed the notch $b^1$, and it is formed at its upper end with a notch, $d^1$, which corresponds to the notch $b^1$. It is operated by a cord, $d^2$, and it will fold up alongside of the bar $b$, as shown in Fig. 2.

$e$ is the draft-rope, fastened in the hole $b^2$. It is provided with a loop or link, $e'$, suitably placed that it may readily be placed over the ends of the bar $b$ and tripping-lever $d$, and caught in the notches $b^1$ and $d$, as shown in Fig. 2.

$f\ f'$ are handles affixed to the arm $a$ and cross-bar $b$, and are used to operate the device when employed as a pruning-shear.

When the device is used as a hay-fork the parts are folded in the position shown in Fig. 3, when the point $c^2$ may be thrust down into the hay to any desired distance. Then, by a proper force exerted on the handles $f f'$, the foot $c$ may be turned to a horizontal position, and the loop $e'$ may be placed on the ends of the cross-bar $b$ and tripping-lever $d$, and caught in the notches $b^1\ d^1$, as shown in Fig. 2, after which the hay can be drawn up by any well-known means.

By drawing on the cord $d^2$ the tripping-lever is drawn down and the link $e'$ is thrown out of the notches and off the cross-bar, and the hay will be discharged.

When the device is used as a pruning-shear it is operated by the handles $f\ f'$. The point $c^1$, being sharp, cuts against the sharp edge $a^2$, and severs the branches caught between the wing $c^1$ and arm $a^1$.

The handle $f$ may be so constructed that it may be attached to another handle of any desired length, thus adapting the device for use for trimming the high branches off trees. The device would in this case be operated by the cords $e$ and $d^2$, alternately.

I claim—

1. The combination, with the foot $c$ and arm $a$, having its lower end pivoted to the center of the winged foot $c$, of the parallel arm $a^1$, having its lower end pivoted to one of the wings of the foot $c$, cross-bar $b$, having notch $b^1$, tripping-lever $d$, having notch $d^1$, and draft-rope $e$, having loop or link $e'$, all arranged to operate substantially as and for the purpose set forth.

2. The combination, with the arm $a$ and foot $c$, pivoted at its center to the lower end of the arm $a$, and having the hooked shear-wing $c^1$, of the parallel arm $a^1$, provided with an edge, $a^2$, cross-bar $b$, and handles $f f'$, substantially as and for the purpose set forth.

In testimony that I claim the foregoing as my own I affix my signature in presence of two witnesses.

BENJAMIN C. CHAMBERS.

Witnesses:
 R. E. MCCAULEEY,
 D. D. SLAYD.